(12) United States Patent
Ezrielev et al.

(10) Patent No.: US 12,368,744 B2
(45) Date of Patent: Jul. 22, 2025

(54) SYSTEM AND METHOD FOR DATA RETENTION BASED ON COMMONALITIES BETWEEN DATA PROCESSING SYSTEMS

(71) Applicant: Dell Products L.P., Round Rock, TX (US)

(72) Inventors: Ofir Ezrielev, Be'er Sheva (IL); Jehuda Shemer, Kfar Saba (IL); Ronen Rabani, Kibuts Telalim (IL)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 18/187,975

(22) Filed: Mar. 22, 2023

(65) Prior Publication Data
US 2024/0323209 A1    Sep. 26, 2024

(51) Int. Cl.
*H04L 9/40* (2022.01)
(52) U.S. Cl.
CPC ...... *H04L 63/1425* (2013.01); *H04L 63/1433* (2013.01)
(58) Field of Classification Search
CPC .................. H04L 63/1425; H04L 63/1433
See application file for complete search history.

(56) References Cited

U.S. PATENT DOCUMENTS

| | | | |
|---|---|---|---|
| 2008/0216160 A1 | 9/2008 | Rollet | |
| 2012/0197929 A1* | 8/2012 | Williams | H04L 43/0817 707/769 |
| 2014/0259130 A1 | 9/2014 | Li | |
| 2015/0033305 A1 | 1/2015 | Shear | |
| 2016/0072787 A1 | 3/2016 | Balabine | |

(Continued)

FOREIGN PATENT DOCUMENTS

| | | | | |
|---|---|---|---|---|
| CN | 113992362 A | * | 1/2022 | |
| EP | 4554142 A1 | * | 5/2025 | ........... H04L 9/0897 |
| GB | 2422455 A | * | 7/2006 | ......... G06F 21/6245 |

OTHER PUBLICATIONS

"Zero Trust—Revolutionary approach to Cyber or just another buzz word?" Deloitte LLP, 2021 (16 Pages).

(Continued)

*Primary Examiner* — Christopher A Revak
(74) *Attorney, Agent, or Firm* — WOMBLE BOND DICKINSON (US) LLP

(57) ABSTRACT

Methods and systems for authenticating data processing systems throughout a distributed environment without user intervention are disclosed. To authenticate data processing systems without user intervention, a system may include a network core and one or more data processing systems. Data processing systems may provide telemetry data to the network core for use in future authentication processes. To increase security throughout the system, the network core may ensure that low security data points are not retained for authentication. A low security data point may be a data point that matches a data point obtained from another data processing system. If a root of trust is lost between a data processing system and the network core, the network core may use retained telemetry data points to generate a security questionnaire. If the data processing system successfully answers security questions of the security questionnaire, the root of trust may be restored.

20 Claims, 8 Drawing Sheets

(56) References Cited

U.S. PATENT DOCUMENTS

| | | | |
|---|---|---|---|
| 2017/0230410 A1 | 8/2017 | Hassanzadeh | |
| 2018/0032724 A1* | 2/2018 | Tang | H04L 63/1416 |
| 2020/0244681 A1 | 7/2020 | Klawe | |
| 2021/0194912 A1* | 6/2021 | Ward | G06F 21/74 |
| 2021/0288995 A1* | 9/2021 | Attar | H04L 41/22 |
| 2021/0342347 A1 | 11/2021 | de Abreu Pinho | |
| 2022/0141026 A1 | 5/2022 | Smith | |
| 2022/0255924 A1 | 8/2022 | Michaud | |
| 2023/0103518 A1 | 4/2023 | Rogers | |
| 2023/0254154 A1* | 8/2023 | Kampanakis | H04L 9/3239 |
| | | | 713/189 |
| 2024/0054245 A1 | 2/2024 | Van Dyne | |
| 2024/0154982 A1 | 5/2024 | Maha | |
| 2024/0232767 A1* | 7/2024 | White | H04L 63/1433 |

OTHER PUBLICATIONS

Awati, Rahul, et al., "certificate revocation list (CRL)" TechTarget, Web Page <https://www.techtarget.com/searchsecurity/definition/Certificate-Revocation-List> accessed on Nov. 22, 2022 (9 Pages).

\* cited by examiner

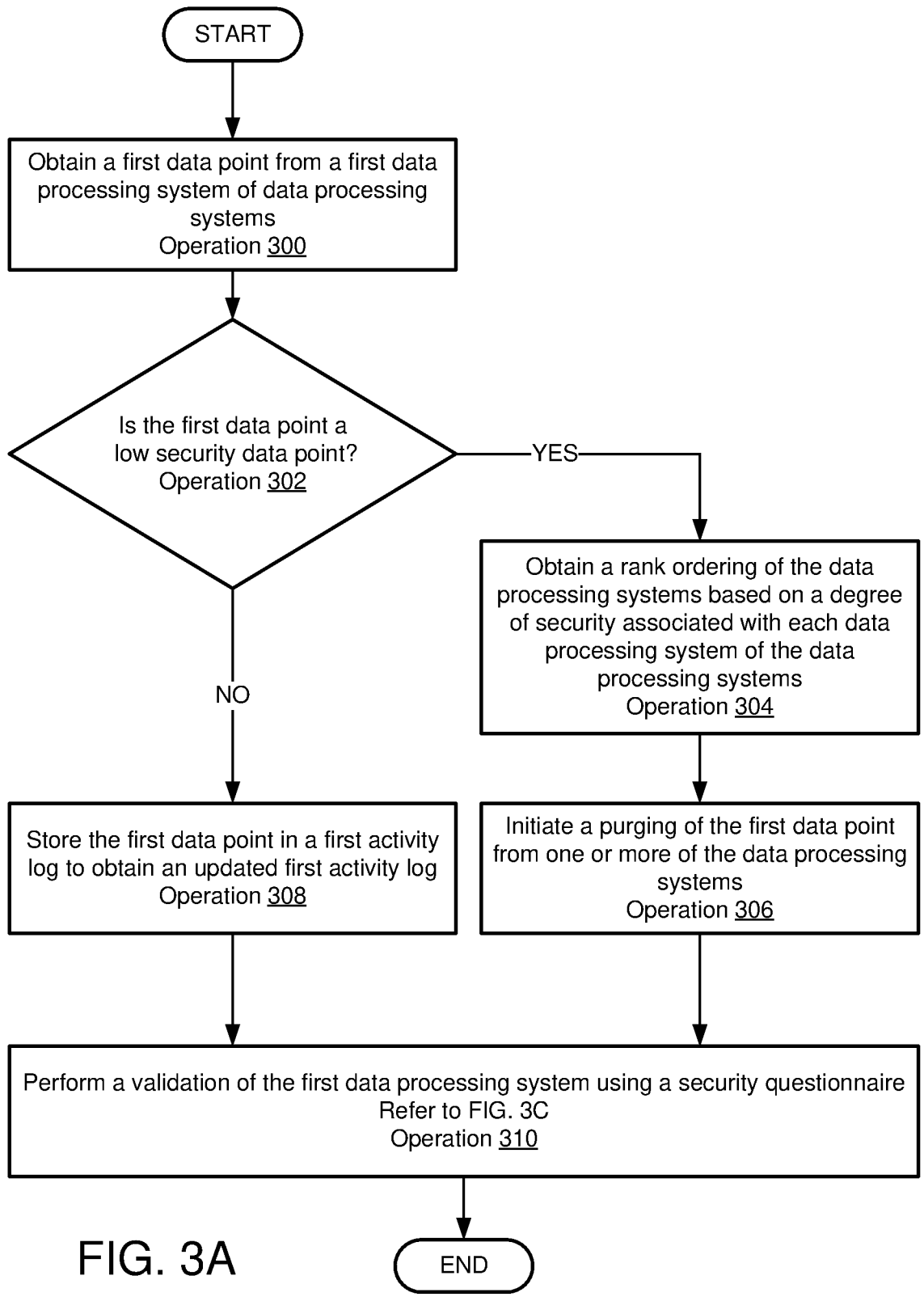

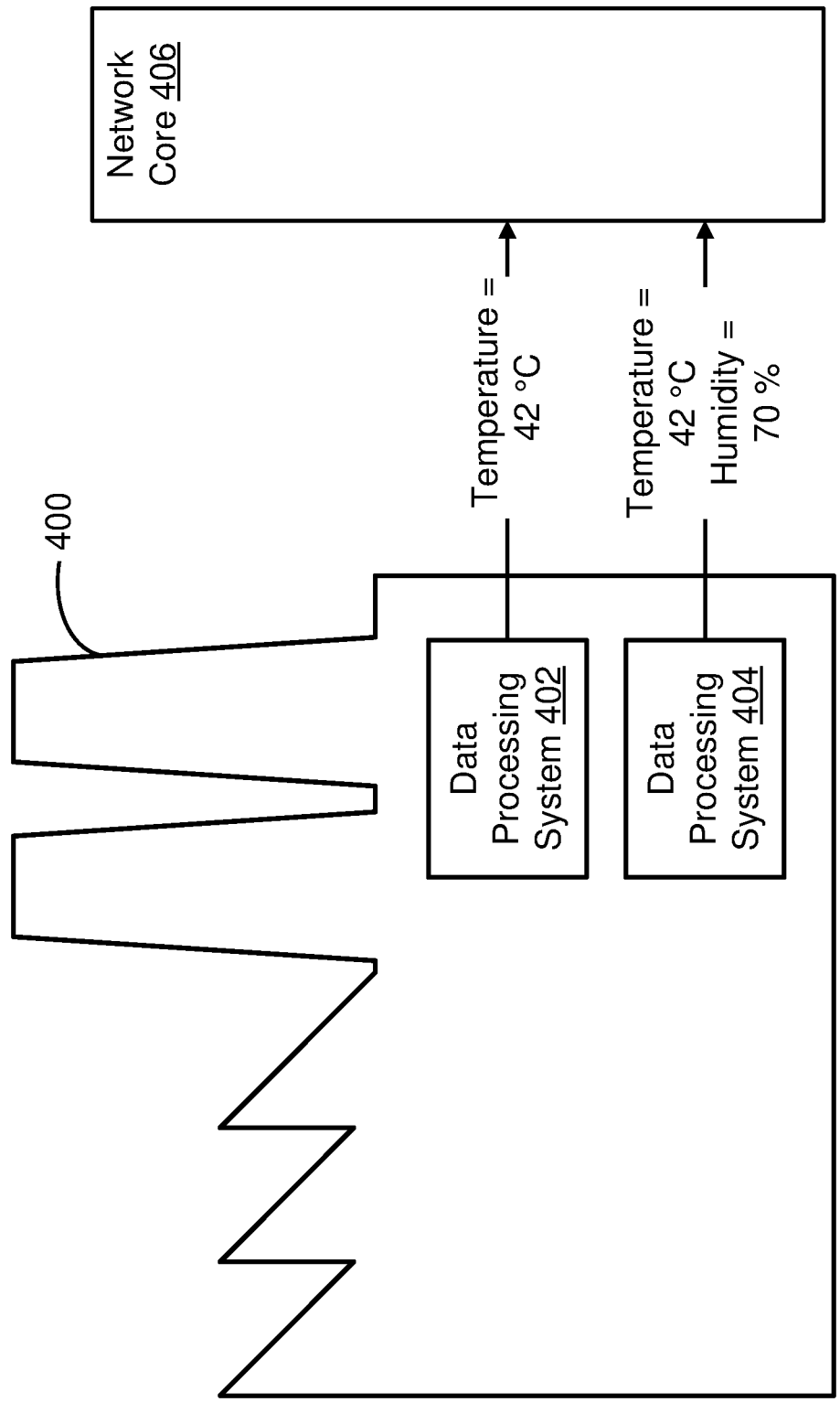

SYSTEM AND METHOD FOR DATA RETENTION BASED ON COMMONALITIES BETWEEN DATA PROCESSING SYSTEMS

FIELD

Embodiments disclosed herein relate generally to device authentication. More particularly, embodiments disclosed herein relate to systems and methods to reduce computing resource expenditure while performing device authentication throughout a distributed environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3A shows a flow diagram illustrating a method of establishing shared knowledge between a network core and a data processing system in accordance with an embodiment.

FIGS. 4A-4B show block diagrams illustrating a system in accordance with an embodiment over time.

DETAILED DESCRIPTION

Figure 1:
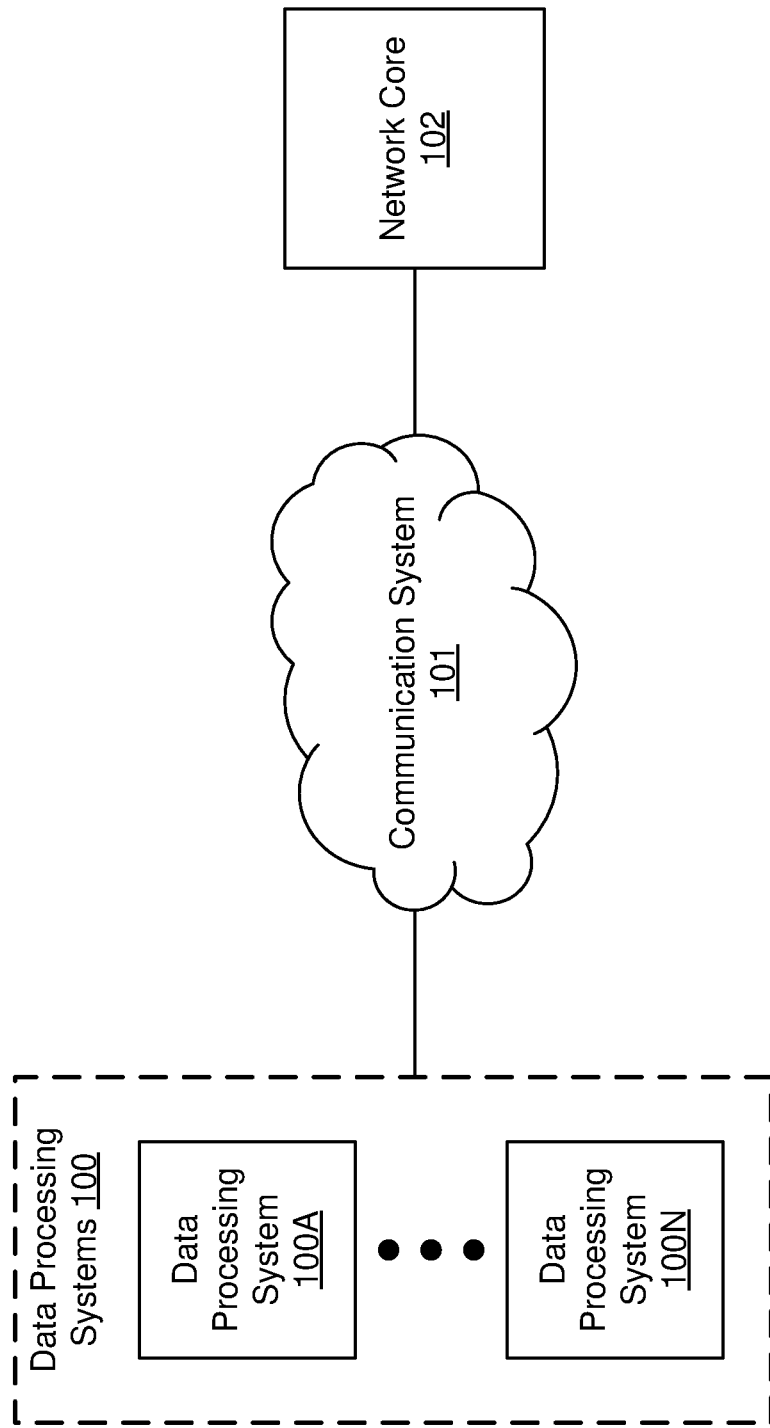
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for authentication of data processing systems throughout a distributed environment without user intervention. To authenticate data processing systems throughout a distributed environment without user intervention, the system may include a network core. The network core may initially establish a root of trust with the data processing systems of the distributed environment via user intervention (a user, for example, entering a password, pin, fingerprint scan, etc.). Once the root of trust is established, a secure communication channel may be opened between the network core and the data processing systems.

However, the root of trust may become lost due to, for example, a duration of time passing, a password change, a cryptographic key change, etc. Re-establishing the root of trust with the data processing systems (e.g., throughout an environment that may be highly distributed with a large number of data processing systems) may be a computationally expensive and time-consuming process. This process may require, for example, a user to re-enter a password, answer security questions, physically re-locate one or more data processing systems, and/or may require other means of user intervention.

To conserve computing resources and efficiently re-establish the root of trust with data processing systems throughout a distributed environment, the system may utilize shared knowledge regarding historical telemetry data of the data processing systems to re-establish the root of trust without user intervention. To do so, the system may collect and store telemetry data of data processing systems following establishment of the root of trust.

The distributed environment may include more than one data processing system positioned in proximity in a shared location. Proximal data processing systems positioned in the shared location may, therefore, each collect data points representative of an event (e.g., an event producing anomalous data points, etc.) occurring in the shared location. Each of the proximal data processing systems may provide the data points representative of the event to the network core for use in future re-authentication processes. However, data points that may be used to re-authenticate more than one data processing system may create a security vulnerability in the distributed environment if the data points are compromised by an unauthorized entity.

To increase security of data points used for re-authentication of proximal data processing systems, the network core may determine whether each data point obtained from a data processing system is a low security data point. A data point may be a low security data point if the data point matches a data point obtained by another data processing system (within a threshold), if the data point is associated with an event already represented by a data point from another data processing system, etc. If the data point is identified as a low security data point, the network core may instruct one or more data processing systems to purge the data point.

Therefore, in the event of dissolution of the root of trust, the system may use the telemetry data to generate a security questionnaire based on shared historical knowledge. The system may provide the security questionnaire to the data processing systems and receive a response including answers to each security question in the security questionnaire. If the answers match (at least substantially) predetermined acceptable answers to the security questions, the network core may recognize the data processing systems as authentic. Once the data processing systems are recognized as authentic, the root of trust may be re-established and secure communications may resume.

Thus, embodiments disclosed herein may provide an improved system for authenticating data processing systems throughout a distributed environment. By doing so, authentication of devices may be re-established following dissolution of a root of trust without intervention from a user and using pre-existing shared knowledge already stored by the data processing system for other purposes. By reducing retention of low security data points across data processing systems, the overall vulnerability of the system may be reduced. Consequently, the root of trust may be efficiently re-established as needed throughout a distributed environment while conserving computing resources and without the intervention by a user.

In an embodiment, a method of authenticating data processing systems by a network core throughout a distributed environment is provided. The method may include: obtaining a first data point from a first data processing system of the data processing systems; making a first determination regarding whether the first data point is a low security data point based on a second data point obtained from a second data processing system of the data processing systems; in a first instance of the first determination in which the first data point is the low security data point: obtaining a rank ordering of the data processing systems based on a degree of security associated with each data processing system of the data processing systems; initiating a purging of the first data point from one or more of the data processing systems based on the rank ordering of the data processing systems; in a second instance of the first determination in which the first data point is not the low security data point: storing the first data point in a first activity log hosted by the network core to obtain an updated first activity log; and performing a validation of a data processing system of the data processing systems using a security questionnaire, the security questionnaire comprising one or more security questions based on the updated first activity log.

Making the first determination may include: making a second determination regarding whether the first data point matches the second data point within a threshold; and in a first instance of the second determination in which the first data point matches the second data point within the threshold: treating the first data point as the low security data point.

Making the first determination may include: making a second determination regarding whether the first data point is associated with a first event, the first event also being associated with the second data point; in a first instance of the second determination in which the first data point is associated with the first event: treating the first data point as the low security data point.

The degree of security associated with each data processing system of the data processing systems may be represented by a security profile, the security profile being based on: a global security score associated with a security risk level of a source of each data point provided by the data processing system; and a data security score associated with characteristics of each data point provided by the data processing system.

The degree of security indicated by the security profile may increase as a number of data sources associated with the first data processing system increases.

The degree of security indicated by the security profile may increase as a number of events represented by data points provided by the first data processing system increases.

Initiating the purging of the first data point from the one or more of the data processing systems may include: identifying the one or more data processing systems based on the rank ordering of the data processing systems; and providing purge instructions to the one or more of the data processing systems, the purge instructions identifying one or more data points to be deleted from the one or more of the data processing systems.

Identifying the one or more of the data processing systems may include: making a third determination regarding whether a rank associated with the first data processing system indicates a lowest degree of security; and in a first instance of the third determination in which the rank associated with the first data processing system indicates the lowest degree of security: excluding the first data processing system from the one or more of the data processing systems; and in a second instance of the third determination in which the rank associated with the first data processing system does not indicate the lowest degree of security: including the first data processing system in the one or more of the data processing systems.

The one or more data points may no longer be available for use in validating authenticity of the one or more data processing systems.

The data processing systems may be positioned in a shared environment and data points associated with events occurring in the shared environment may be collected by each data processing system of the data processing systems.

Performing the validation of the data processing system may include: identifying an occurrence of an event indicating that the data processing system is to be authenticated; obtaining a security questionnaire, based on the occurrence of the event, using the first activity log and a security risk level of the data processing system; providing the security questionnaire to the data processing system; obtaining a response, the response comprising answers to the security questions in the security questionnaire; making a determination regarding whether each answer of the answers matches a pre-determined answer from a set of possible answers; and in an instance of the determination in which each answer of the answers matches the pre-determined answer: concluding that the data processing system is authentic.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include monitoring services (e.g., of locations), communication services, and/or any other type of computer-implemented services.

To provide the computer-implemented services, the system may include network core 102. Network core 102 may provide all, or a portion of, the computer-implemented services. For example, network core 102 may provide computer-implemented services to users of network core 102 and/or other computing devices operably connected to network core 102. The computer-implemented services may include any type and quantity of services including, for example, authentication of data processing systems.

To facilitate authentication of data processing systems, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the authentication of data processing systems.

All, or a portion, of data processing systems 100 may provide (and/or participate in and/or support the) computer-implemented services to various computing devices operably connected to data processing systems 100. Different data processing systems may provide similar and/or different computer-implemented services.

When providing the computer-implemented services, the system of FIG. 1 may determine whether devices throughout a distributed system are authenticated prior to exchanging sensitive information. To do so, the system of FIG. 1 may establish a root of trust to each data processing system throughout the distributed environment.

However, roots of trust may be lost and/or otherwise become invalid over time. Re-establishing roots of trust may be a computationally expensive and time-consuming process, as highly distributed environments may include multiple data processing systems that may each individually require re-establishment of roots of trust at different times and/or via different means. Re-establishing a root of trust may require a user to, for example, answer security questions, may require the data processing systems to store additional authentication data, and/or may require other means of intervention by the user. By doing so, undesirable amounts of computing resources may be consumed by the data processing systems and/or the network core (which may each have a limited amount of computing resources available for operation and storage), and delays may occur in operation of the system.

In general, embodiments disclosed herein may provide methods, systems, and/or devices for maintaining authentication of data processing systems throughout a distributed environment without user intervention. To maintain authentication of data processing systems, the system of FIG. 1 may establish an initial root of trust to any number of data processing systems throughout the distributed environment. Following establishment of the root of trust, the data processing systems may provide the network core with telemetry data. Therefore, both the network core and the data processing systems may maintain substantially identical activity logs storing the telemetry data.

The distributed environment may include more than one data processing system positioned in proximity in a shared location. Proximal data processing systems positioned in the shared location may, therefore, each collect data points representative of an event (e.g., an event producing anomalous data points, etc.) occurring in the shared location. Each of the proximal data processing systems may provide the data points representative of the event to the network core for use in future re-authentication processes. However, data points that may be used to re-authenticate more than one data processing system may create a security vulnerability in the distributed environment if the data points are compromised by an unauthorized entity.

To increase security of data points used for re-authentication of proximal data processing systems, the network core may determine whether each data point obtained from a data processing system is a low security data point. A data point may be a low security data point if the data point matches a data point obtained by another data processing system (within a threshold), if the data point is associated with an event already represented by a data point from another data processing system, etc. If the data point is identified as a low security data point, the network core may instruct one or more data processing systems to purge the data point from an activity log. The network core may instruct one or more of the data processing systems to purge the data point at a specified time (e.g., after a matching data point is used for a re-authentication process, immediately following data collection, and/or at other times).

In the event of a dissolution of the root of trust, the network core may utilize the retained telemetry data previously provided by the data processing system to generate a security questionnaire. The security questionnaire may include questions related to past communications, errors, updates, etc. of the data processing systems. The security questionnaire may be provided to the data processing systems and the data processing systems may generate a response including answers to the questions in the security questionnaire using the previously stored telemetry data.

As the data processing systems already store the telemetry data for other purposes (e.g., data backup, system updates, etc.) accessing the telemetry data to answer questions in the questionnaire may not require additional data to be processed or stored by the data processing systems during re-authentication. The data processing systems may provide a response to the network core and the network core may determine whether the answers provided in the response match previously determined accepted answers to the questions. If the answers match the previously determined accepted answers, the data processing systems may be considered authentic. By doing so, data processing systems may be more efficiently re-authenticated following dissolution of a root of trust throughout a distributed environment. As a distributed environment may include many data processing systems and roots of trust may be revoked for various reasons over time, this method of re-establishing trust between the data processing systems and the network core without user intervention provides a timely and computationally efficient solution.

To provide the above noted functionality, the system of FIG. 1 may include network core 102. Network core 102 may (i) obtain a first data point from a first data processing system, and/or (ii) determine whether the first data point is a low security data point. If the first data point is the low security data point, network core 102 may (i) obtain a rank ordering of the data processing systems based on a degree of security associated with each data processing system, (ii) initiate a purging of the first data point from one or more of the data processing systems, (iii) obtain an updated first activity log, and/or (iv) perform a validation of the first data processing system using the updated first activity log. If the first data processing system is not the low security data point, network core 102 may (i) obtain an updated first activity log, and/or (ii) perform a validation of the first data processing system using the first updated activity log.

When performing its functionality, network core 102 and/or data processing systems 100 may perform all, or a portion, of the methods and/or actions shown in FIGS. 2A-4B.

Data processing systems 100 and/or network core 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100 and/or network core 102 are implemented using an internet of things (IoT) device, which may include a computing device. The IoT device may operate in accordance with a communication model and/or management model known to network core 102, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
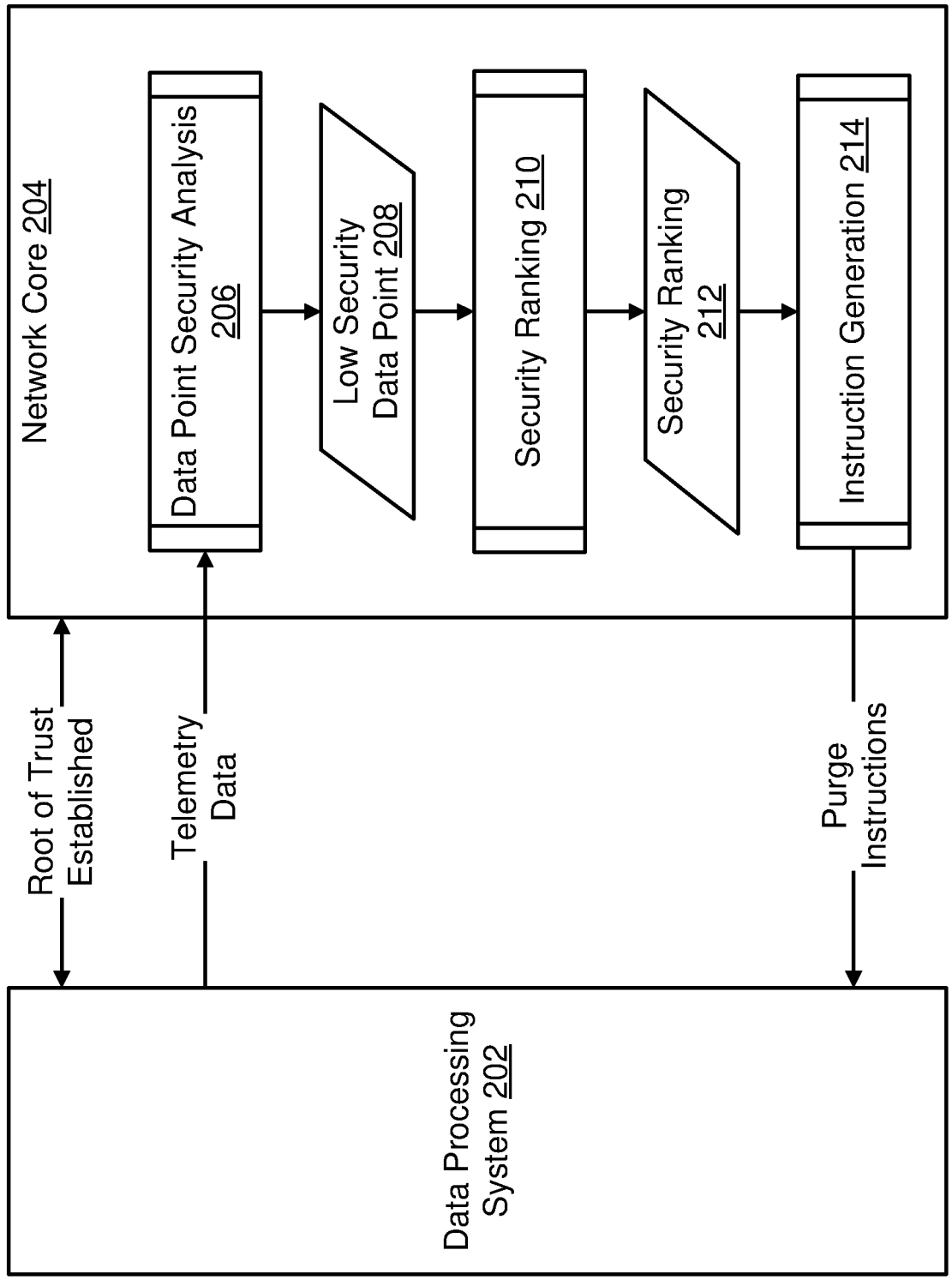
FIG. 2A shows a block diagram illustrating a network core analyzing telemetry data obtained from a data processing system in accordance with an embodiment.
Figure 2B:
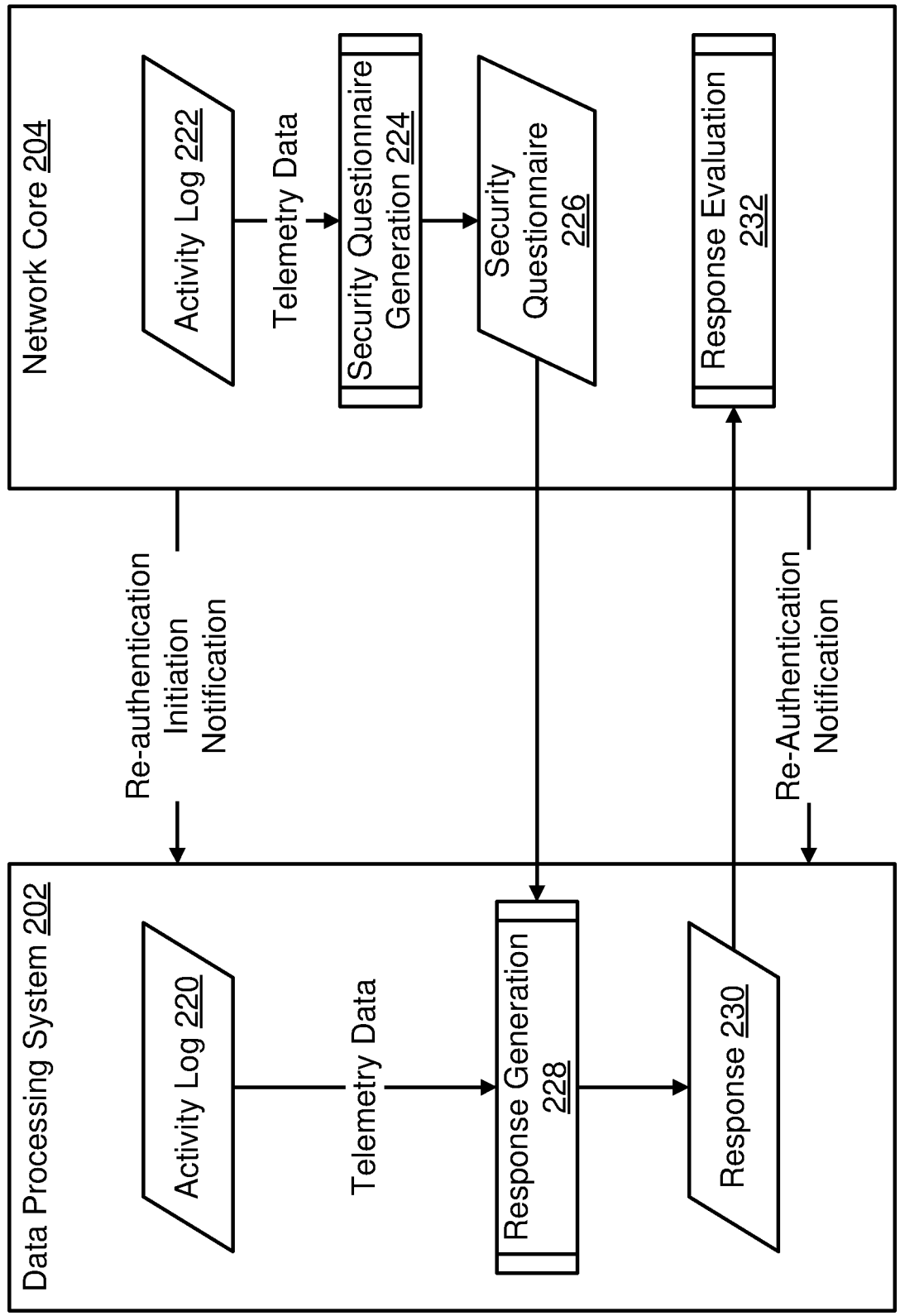
FIG. 2B shows a block diagram illustrating a network core authenticating a data processing system over time in accordance with an embodiment.

To further clarify embodiments disclosed herein, diagrams illustrating data flows and/or processes performed in a system in accordance with an embodiment are shown in FIG. 2A-2B.

FIG. 2A shows a diagram of network core 204 interacting with data processing system 202. Network core 204 may be similar to network core 102 shown in FIG. 1. In FIG. 2A, network core 204 may be connected to data processing system 202 via a communication system (not shown). Data processing system 202 may be similar to any of data processing systems 100. Communications between network core 204 and data processing system 202 are illustrated using lines terminating in arrows.

As discussed above, network core 204 may perform computer-implemented services by authenticating devices throughout a distributed environment. Data processing system 202 may be one of a plurality of data processing systems positioned in a shared environment (not shown). Therefore, data points associated with events in the shared environment may be collected by each data processing system of the plurality of the data processing systems positioned in the shared environment.

To authenticate data processing system 202, network core 204 may establish a root of trust with data processing system 202. The root of trust may indicate that data processing system 202 is authenticated and may exchange secure communications with network core 204. The root of trust may be established via any means including, for example, a user entering a password, pin, biometric factor, etc. Following establishment of the root of trust, data processing system 202 may provide telemetry data to network core 204. Telemetry data may include any data related to the operation of data processing system 202 that may be useful to monitor and/or assess the performance, security, etc. of the data processing system. For example, telemetry data may include: (i) lifecycle data reflecting operation of data processing system 202, (ii) content of messages transmitted from data processing system 202 to network core 204, (iii) statistics associated with operation of data processing system 202, (iv) error event data reflecting a subset of the operation of data processing system 202, the subset including undesired operation of data processing system 202, and/or other data.

The telemetry data may be data obtained by data processing system 202 from any number of data sources (not shown) associated with data processing system 202. For example, data sources may be sensors positioned throughout an environment to collect data (e.g., temperature data, humidity data, etc.) related to the environment. Data processing system 202 may utilize a data retention policy (not shown) to provide the telemetry data to network core 204. The data retention policy may include rules for determining which data points to retain and transmit to network core 204 and which data points to discard.

Network core 204 may perform data point security analysis 206 process using the telemetry data. Data point security analysis 206 process may include screening data points of the telemetry data to determine whether any data points of the telemetry data are low security data points. In FIG. 2A, network core 204 may identify a data point of the telemetry data as low security data point 208. Low security data point 208 may include a data point of the telemetry data that matches (within a threshold) one or more data points obtained from another data processing system. Low security data point 208 may also include any data point of the telemetry data that is associated with the same event as one or more data points obtained from another data processing system. Refer to FIG. 3A for additional information regarding identifying low security data points.

Network core 204 may perform security ranking 210 process using low security data point 208 to obtain security ranking 212. Security ranking 210 process may include obtaining a listing of data processing systems from which low security data point 208 was obtained and ranking the data processing systems included in the listing of the data processing systems based on a degree of security associated with each of the data processing systems of the listing of the data processing systems. The degree of security associated with each data processing system of the listing of the data processing systems may be represented by a security profile.

For example, a security profile associated with data processing system 202 may be based on: (i) a global security score associated with a security risk level of a source of each data point provided by data processing system 202, and/or (ii) a data security score associated with characteristics of each data point provided by data processing system 202.

Therefore, the degree of security indicated by the security profile may increase as a number of data sources associated with data processing system 202 increases. In addition, the degree of security indicated by the security profile may also increase as a number of events represented by data points provided by data processing system 202 increases.

Security ranking 212 may include a listing of data processing systems from which low security data point 208 was obtained ordered by the degree of security associated with each data processing system of the listing of the data processing systems.

Network core 204 may perform instruction generation 214 process using security ranking 212. Instruction generation 214 process may include identifying a data processing system with a lowest degree of security from security ranking 212 and generating instructions for the data processing system with the lowest degree of security to retain low security data point 208 (or no instructions may be generated with relation to retaining low security data point 208).

Data processing system 202 may not be the data processing system with the lowest degree of security in security ranking 212 and, therefore, may be provided with purge instructions. The purge instructions may identify one or more data points (e.g., low security data point 208) to be deleted. By doing so, the one or more data points (e.g., low security data point 208) may no longer be available for use in validating authenticity of data processing system 202.

Turning to FIG. 2B, data processing system 202 may host activity log 220 and network core 204 may host activity log 222. Activity log 220 and activity log 222 may include substantially identical data points of the telemetry data.

The root of trust established in FIG. 2A may be invalidated due to, for example, password changes, cryptographic key exposure, security certificate changes, and/or for other reasons. If the root of trust is lost, network core 204 may transmit a re-authentication initiation notification to data processing system 202. Data processing system 202 may transmit a response (not shown) to establish that data processing system 202 is ready to participate in a re-authentication process.

To re-authenticate data processing system 202 without user intervention, network core 204 may perform security questionnaire generation 224 process. Security questionnaire generation 224 process may include generating security questionnaire 226 using telemetry data from activity log 222 (e.g., based on historic activities performed by data processing system 202) and a security risk level of data processing system 202 (not shown). Activity log 222 and activity log 220 may be exclusively used for re-establishing a root of trust between data processing system 202 and network core 204 after the root of trust is lost. The security risk level may be stored in activity log 222 or may be stored elsewhere and may indicate a level of threat to network core 204 associated with a potential security breach of data processing system 202.

To perform security questionnaire generation 224 process, network core 204 may obtain a shared knowledge requirement (not shown). The shared knowledge requirement may be based on the security risk level and may indicate a cardinality and distribution of security questions to be created based on the telemetry data in activity log 222. Network core 204 may retrieve a portion of the telemetry data from activity log 222 based on the shared knowledge requirement and may populate security questionnaire 226 with a series of security questions based on the portion of the telemetry data. Network core 204 may also generate a set of acceptable answers to the security questions.

Network core 204 may transmit security questionnaire 226 to data processing system 202. Data processing system 202 may perform response generation 228 process using the security questionnaire to generate response 230. Response generation 228 process may include retrieving a portion of the telemetry data from activity log 220 to compile answers the security questions. Response 230 may include answers that are responsive to security questions of security questionnaire 226.

Data processing system 202 may transmit response 230 to network core 204 and network core 204 may perform response evaluation 232 process using the response 230 and the previously established set of acceptable answers (not shown). If the answers in response 230 match the answers in the set of acceptable answers (to a degree considered acceptable by network core 204), data processing system 202 may be concluded to be authentic. If the answers in response 230 do not match the answers in the set of acceptable answers, data processing system 202 may not be concluded to be authentic.

In response to concluding that data processing system 202 is authentic, network core 204 may transmit a re-authentication notification to notify data processing system 202 of successful re-authentication. By re-authenticating data processing system 202 using telemetry data already stored by data processing system 202 and without user intervention, authentication of devices throughout a distributed environment may be timely and computationally efficiently maintained.

In an embodiment, network core 204 is implemented using a processor adapted to execute computing code stored on a persistent storage that when executed by the processor performs the functionality of network core 204 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3B:
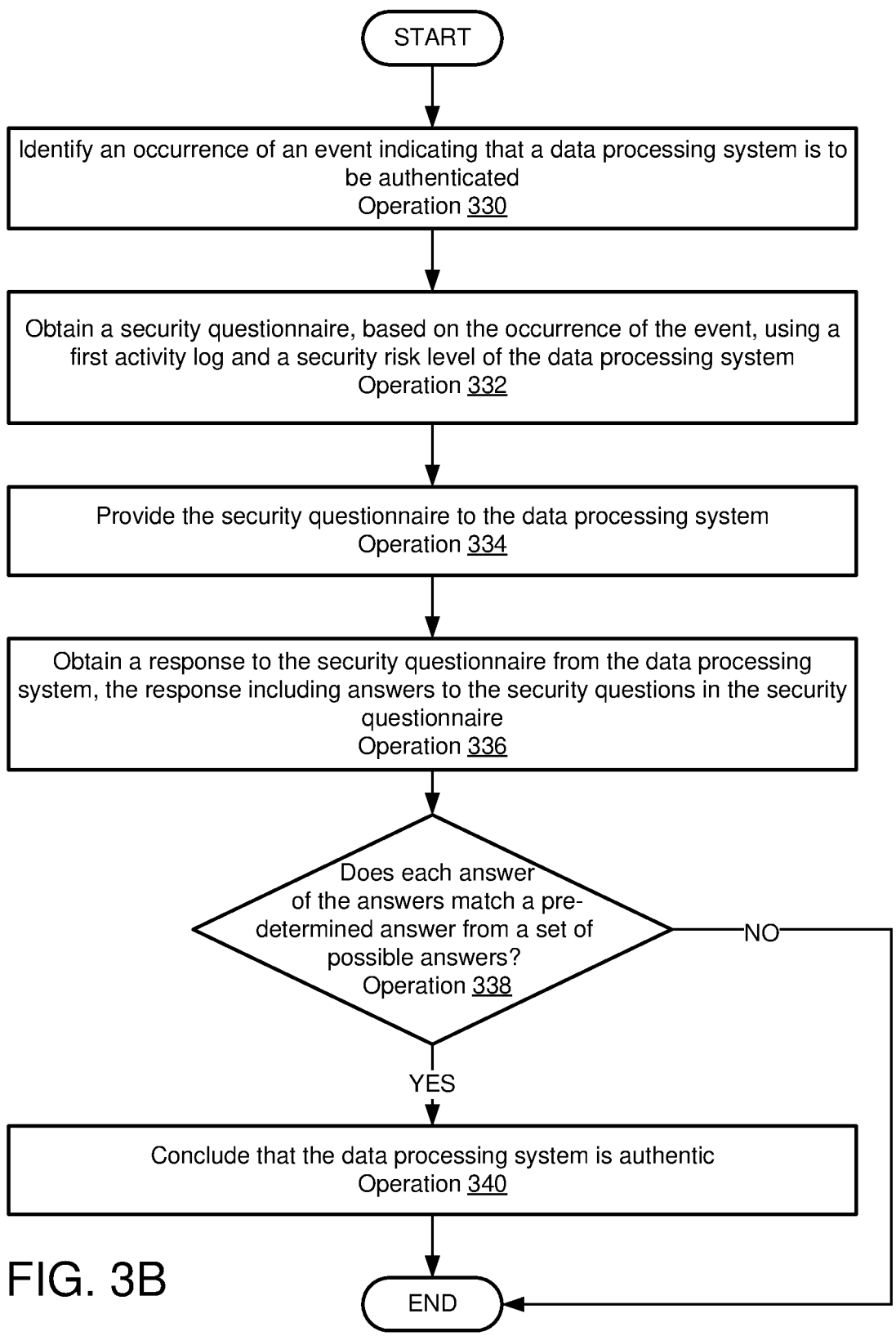
FIG. 3B shows a flow diagram illustrating a method of performing a validation of a data processing system in accordance with an embodiment.

As discussed above, the components of FIG. 1 may perform various methods to perform device authentication in a distributed environment without user intervention. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of establishing shared knowledge between a network core and a data processing system in accordance with an embodiment is shown. The method may be performed, for example, by a network core, data processing system, and/or any other device.

At operation 300, a first data point is obtained from a first data processing system of data processing systems. The first data point may be obtained in the form of a message via a secure connection, may be read from storage, may be obtained by accessing a database of data points, and/or may be obtained via other methods. The first data point may be obtained automatically, as part of a regularly scheduled data transmission, and/or upon request by another entity. The first data point may also be transmitted to another trusted device and the first data point may be obtained from the trusted device.

At operation 302, it is determined whether the first data point is a low security data point. To determine whether the first data point is the low security data point, a second data point may be obtained from a second data processing system of the data processing systems (via a message transmitted over a communication system, from storage, from another entity, etc.).

In a first example, the first data point may be the low security data point if the first data point matches the second data point within a threshold. To determine whether the first data point matches the second data point within the threshold: (i) a difference may be obtained between the first data point and the second data point, and/or (ii) the difference may be compared to the threshold.

The difference may be obtained, for example, by subtracting a first numerical value associated with the first data point (e.g., a first temperature measurement) from a second numerical value associated with the second data point (e.g., a second temperature measurement). Differences may be obtained via other means without departing from embodiments disclosed herein.

To compare the difference the threshold, the threshold may be obtained, and the value of the threshold may be compared to the value of the difference. The threshold may be obtained by generating the threshold, reading the threshold from storage, requesting the threshold from another entity responsible for generating thresholds, and/or via other methods.

If the first data point matches the second data point within the threshold, the first data point may be treated as the low security data point. To treat the first data point as the low security data point, an identifier associated with the first data point may be modified to include a label indicating that the first data point is the low security data point. The first data point may also be treated as the low security data point by transmitting the first data point to another entity responsible for managing low security data points.

In a second example, the first data point may be the low security data point if the first data point is associated with a first event, the first event also being associated with the second data point.

The first event may include an anomalous event resulting in an anomalous temperature measurement. The first data point and the second point may both be associated with the anomalous temperature measurement. However, the second data point may be collected by a less accurate temperature sensor obtaining temperature measurements less frequently and may report the anomalous temperature measurement, for example, as 20° C. The first data point may be collected by a more accurate temperature sensor obtaining temperature measurements more frequently and may report the anomalous temperature as 25.03° C.

The first event may also include an anomalous event resulting in failure of a first device in an industrial environment and the first data point may indicate the failure of the first device. The failure of the first device may lead to failure of a second device within the industrial environment. The second data point, therefore, may be associated with the failure of the second device.

To determine whether the first data point is associated with the first event, metadata (e.g., including a timestamp and/or other indicators) associated with the first data point may be obtained and compared to an identifier of the first event and/or other identifiers (e.g., metadata indicating a linked event such as the failure of the second device described above).

The metadata may be obtained by reading the metadata from storage, by retrieving the metadata from a database, by requesting the metadata from another entity, and/or via other methods.

The identifier of the first event may be obtained by reading the identifier of the first event from storage, by requesting the identifier of the first event from another entity, and/or via other methods.

If at least a portion of the metadata matches the identifier of the first event, the data point may be treated as the low security data point. To treat the first data point as the low security data point, an identifier associated with the first data point may be modified to include a label indicating that the first data point is the low security data point. The first data point may also be treated as the low security data point by transmitting the first data point to another entity responsible for managing low security data points.

If the data point is the low security data point, the method may proceed to operation 304. If the first data point is not the low security data point, the method may proceed to operation 308.

At operation 304, a rank ordering of the data processing systems is obtained based on a degree of security associated with each data processing system of the data processing systems. The rank ordering of the data processing systems may be obtained by: (i) obtaining a listing of security profiles, each security profile of the listing of the security profiles being associated with a data processing system of the data processing systems, and/or (ii) ranking the listing of the security profiles based on a degree of security indicated by each security profile of the listing of the security profiles to obtain the rank ordering of the security profiles.

The listing of the security profiles may be obtained by: (i) generating each security profile of the listing of the security profiles, (ii) reading each security profile of the listing of the security profiles from storage, (iii) requesting each security profile of the listing of the security profiles from another entity, and/or via other methods. As previously mentioned in FIG. 2A, the security profiles may indicate a degree of security associated with the data processing system.

To rank the listing of the security profiles, the data processing systems may be ordered based on the degree of security indicated by the security profiles. The data processing systems may be ordered in any manner (e.g., increasing security, decreasing security, etc.) to obtain the rank ordering of the security profiles. Ranking the listing of the security profiles may also include transmitting the listing of the security profiles to another entity responsible for obtaining the rank ordering of the security profiles.

At operation 306, a purging of the first data point from one or more of the data processing systems is initiated. The purging of the first data point from the one or more of the data processing systems may be initiated by: (i) identifying the one or more data processing systems based on the rank ordering of the data processing systems, and/or (ii) providing purge instructions to the one or more of the data processing systems.

The one or more data processing systems may be identified by determining whether a rank associated with the first data processing system indicates a lowest degree of security. If the rank associated with the first data processing system indicates the lowest degree of security, the first data processing system may be excluded from the one or more of the data processing systems. If the rank associated with the first data processing system does not indicate the lowest degree of security, the first data processing system may be included in the one or more of the data processing systems.

To determine whether the rank associated with the first data processing system indicates the lowest degree of security, the rank associated with the first data processing system may be obtained and compared to the rank ordering of the security profiles.

The rank associated with the first data processing system may be obtained by reading the rank from storage, by accessing a database storing ranks, by requesting the rank from another entity, and/or via other methods.

The rank may be compared to the rank ordering of the security profiles by identifying the location of the rank in the rank ordering of the security profiles.

Excluding the first data processing system from the one or more of the data processing systems may include generating a data structure intended to include identifiers of the one or more of the data processing systems and not adding the first data processing system to the data structure. Excluding the first data processing system from the one or more of the data processing systems may also include modifying an existing data structure associated with the one or more of the data processing systems and ensuring that the first data processing system is not added to the data structure.

Including the first data processing system in the one or more of the data processing systems may include adding the first data processing system to a data structure associated with the one or more of the data processing systems. To do so, a new data structure may be generated and/or an existing data structure may be modified. Adding the first data processing system to the data structure may include addition of an identifier associated with the first data processing system to the data structure.

The purge instructions may be provided to the one or more of the data processing systems by transmitting a message over a communication system, by providing a notification through an application on a device including instructions for accessing the purge instructions from a database, by requesting another entity transmit the purge instructions to the one or more of the data processing systems, etc.

Returning to operation 302, if the first data point is not the low security data point, the method may proceed to operation 308.

At operation 308, the first data point is stored in a first activity log to obtain an updated first activity log. Storing the first data point in the first activity log may include adding the first data point to a data structure associated with the first activity log and implementing a storage procedure. The data structure may be a newly generated data structure or an existing data structure. Obtaining the updated first activity log may also include modifying data associated with the first activity log such as a timestamp of the latest update, etc. Storing the first data point in the first activity log may also include transmitting the first data point to another entity along with instructions for storing the first data point in the first activity log.

At operation 310, a validation of the first data processing system is performed using the updated first activity log. Performing the validation of the data processing system may include: (i) identifying an occurrence of an event indicating that the data processing system is to be authenticated, (ii) obtaining a security questionnaire, based on the occurrence of the event, using a first activity log, (iii) providing the security questionnaire to the data processing system, (iv) obtaining a response from the data processing system, the response including answers to the security questions in the security questionnaire, (v) determining whether each answer of the answers matches a pre-determined answer from a set of possible answers, and/or (vi) if each answer of the answers matches the pre-determined answer, concluding that the data processing system is authentic. Refer to FIG. 3C for additional details regarding performing the validation of the first data processing system.

The method may end following operation 310.

Turning to FIG. 3B, a flow diagram illustrating a method of performing a validation of the first data processing system in accordance with an embodiment is shown. The method may be performed, for example, by a network core, data processing system, and/or any other device. The operations shown in FIG. 3B may be an expansion of operation 310 in FIG. 3A.

At operation 330, an occurrence of an event indicating that a data processing system is to be authenticated is identified. The occurrence of the event may place the previously established secure communication channel into a potentially compromised state. The occurrence of the event may be identified by: (i) receiving a notification that the secure connection has been lost, and/or (ii) terminating the secure connection. The secure connection may be terminated in response to an identification of: (i) a password change, (ii) exposure of the cryptographic key, (iii) a security certificate time-out, and/or other reasons.

At operation 332, a security questionnaire is obtained, based on the occurrence of the event, using a first activity log and a security risk level of the data processing system. Obtaining the security questionnaire may include: (i) obtaining a shared knowledge requirement based on the security risk level of the data processing system, (ii) obtaining a portion of the telemetry data from the first activity log based on the shared knowledge requirement, (iii) obtaining at least one security question based on the portion of the telemetry data, (iv) populating the security questionnaire with the at least one security question, and (v) obtaining a pre-determined answer for each answer of the answers based on the portion of the telemetry data and the security questionnaire.

Obtaining the shared knowledge requirement may include obtaining the security risk level of the data processing system. The security risk level may be calculated based on telemetry data in the first activity log, specifications (e.g., connectivity to the network core, computing resource availability, device privileges, etc.) related to the data processing system, and/or other statistics. The security risk level may also be obtained from another device responsible for generating and/or storing security risk levels. The shared knowledge requirement may then be generated based on an analysis of the security risk level and the telemetry data available in the first activity log. The shared knowledge requirement may also be requested from another device responsible for generating and/or storing shared knowledge requirements for data processing systems.

The portion of the telemetry data may be obtained by accessing the first activity log. To access the first activity log, a lookup may be performed using a telemetry data lookup table and at least a portion of the shared knowledge requirement as a key for the telemetry data lookup table. The portion of the telemetry data may also be obtained by: (i) transmitting a request for the portion of the telemetry data to a device storing the telemetry data, and/or (ii) obtaining access credentials to a database and using the access credentials to gain access to the first activity log stored in the database.

The at least one security question may be obtained by feeding the portion of the telemetry data into an inference model or rules-based engine trained to form questions based on input data. The at least one security question may also be obtained by transmitting telemetry data to another device responsible for generating security questions and receiving the at least one security question as a response from the device.

The security questionnaire may be populated with the at least one security question by generating a data structure to be treated as the security questionnaire and adding the at least one security question to the data structure. The at least one security question may also be added to an existing security questionnaire and previous security questions may be adapted, deleted, or analyzed to determine continued relevance.

The security questionnaire may be populated with the at least one security question by transmitting the at least one security question to another device responsible for generating the security questionnaire based on security questions.

The pre-determined answer for each answer of the answers may be obtained by feeding the security questionnaire and the portion of the telemetry data into an inference model trained to generate possible acceptable answers to each security question of the security questionnaire. The possible acceptable answers may be added to a (previously generated or newly generated) data structure to be treated as the answers.

At operation 334, the security questionnaire is provided to the data processing system. The security questionnaire may be transmitted to the data processing system over a communication system. The security questionnaire may be transmitted automatically when the security questionnaire is generated, may be transmitted upon receipt of a notification that the data processing system is ready to receive the security questionnaire and/or may be transmitted based on any other schedule. The security questionnaire may be provided to the data processing system by sending a notification to another device storing the security questionnaire to transmit the security questionnaire to the data processing system.

At operation 336, a response to the security questionnaire is obtained from the data processing system, the response including answers to the security questions in the security questionnaire. The response may be obtained via a message transmitted by the data processing system over the communication system. Obtaining the response may include decrypting the response using a previously shared cryptographic key, by generating a hash of the pre-determined answers to compare to a hash included in the response, and/or other security measures.

At operation 338, it is determined whether each answer of the answers matches a pre-determined answer from a set of possible answers. If each answer of the answers matches the pre-determined answer from the set of possible answers, the method may proceed to operation 340. If each answer of the answers does not match the pre-determined answer from the set of possible answers, the method may end following operation 338.

Whether each answer of the answers matches a pre-determined answer from a set of possible answers may be determined by: (i) obtaining a first answer from the response, the first answer corresponding to a first security question of the at least one security questions, (ii) determining whether the first answer matches a corresponding pre-determined answer from the set of possible answers, and (iii) if the first answer matches the corresponding pre-determined answer, treating the first answer as accurate.

Obtaining the first answer from the response may include parsing the response into answers to each security question and selecting one of the answers to one of the security questions as the first answer. The first answer may be selected at random, may be selected by selecting the first question in the security questionnaire, and/or may be selected via another selection methodology. The response may also be transmitted to another device responsible for selecting the first answer.

To determine whether the first answer matches the pre-determined answer from the set of possible answers, the pre-determined answer may be obtained. The pre-determined answer (or answers) corresponding to the security question may be selected from the set of possible answers, and the first answer may be compared to the pre-determined answer or answers. If the first answer matches the pre-determined answers (at least substantially or to an extent determined acceptable), the first answer may be considered accurate.

The above-described process may be repeated for each answer included in the response until all answers included in the response have been determined to be accurate or inaccurate.

At operation 340, the data processing system is concluded to be authentic. The data processing system may be concluded to be authentic without the user intervention. Concluding the data processing system to be authentic may include evaluating the accuracy of answers in the response to determine whether the response is accurate enough to consider the data processing system to be authentic. Evaluating the accuracy of the answers in the response may include comparing the number of correct answers to a previously determined amount of acceptable correct answers. Evaluating the accuracy of the answers may be performed via other means, such as comparing a percent accuracy to an acceptable percentage of accuracy, etc. If the answers in the response are considered acceptably accurate, the data processing system may be concluded to be authentic, and the root of trust may be re-established without user intervention. Re-establishing the root of trust may include establishing a new secure communications channel to the data processing system and distributing a new cryptographic key to the data processing system.

The method may end following operation 340.

Turning to FIG. 4A, consider a scenario in which two data processing systems (e.g., data processing system 402 and data processing system 404) are positioned in an industrial environment (e.g., 400). Data processing system 402 may be associated with a temperature sensor positioned to collect temperature data in industrial environment 400. Data processing system 404 may be associated with a temperature sensor and a humidity sensor both positioned in industrial environment 400.

Data processing system 402 may identify a first data point (e.g., temperature=42° C.) as a data point that meets a data retention policy (e.g., due to the degree of anomalousness of the first data point, etc.) and data processing system 402 may transmit the first data point to network core 406 for use in future re-authentication processes.

An anomalous event occurring in industrial environment 400 may have led to data processing system 402 collecting the first data point. Due to data processing system 404 being positioned proximate to data processing system 402 in industrial environment 400, data processing system 404 may collect data related to the same anomalous event. As data processing system 404 is associated with two data sources (e.g., a temperature sensor and a humidity sensor) data processing system may transmit two data points (e.g., temperature=42° C. and humidity=70%) to network core 406.

Network core 406 may receive the temperature measurement of 42° C. from data processing system 404 and may identify that this temperature measurement matches the first data point obtained from data processing system 402. To reduce security vulnerability across the system, network core 406 may identify one of data processing system 402 and data processing system 404 to delete the temperature measurement.

To do so, network core 406 may determine whether data processing system 402 has an activity log indicating a higher degree of security than an activity log hosted by data processing system 404. Activity logs may have higher degrees of security if they include data points from multiple data sources and/or if they include data points with certain characteristics (e.g., higher degrees of anomalousness, etc.). Network core 406 may determine that data processing system 404 has a more secure activity log due to the multiple data sources associated with data processing system 404. Therefore, the first data point (42° C.) may be retained by data processing system 402 to increase security of the activity log hosted by data processing system 402.

Figure 4B:
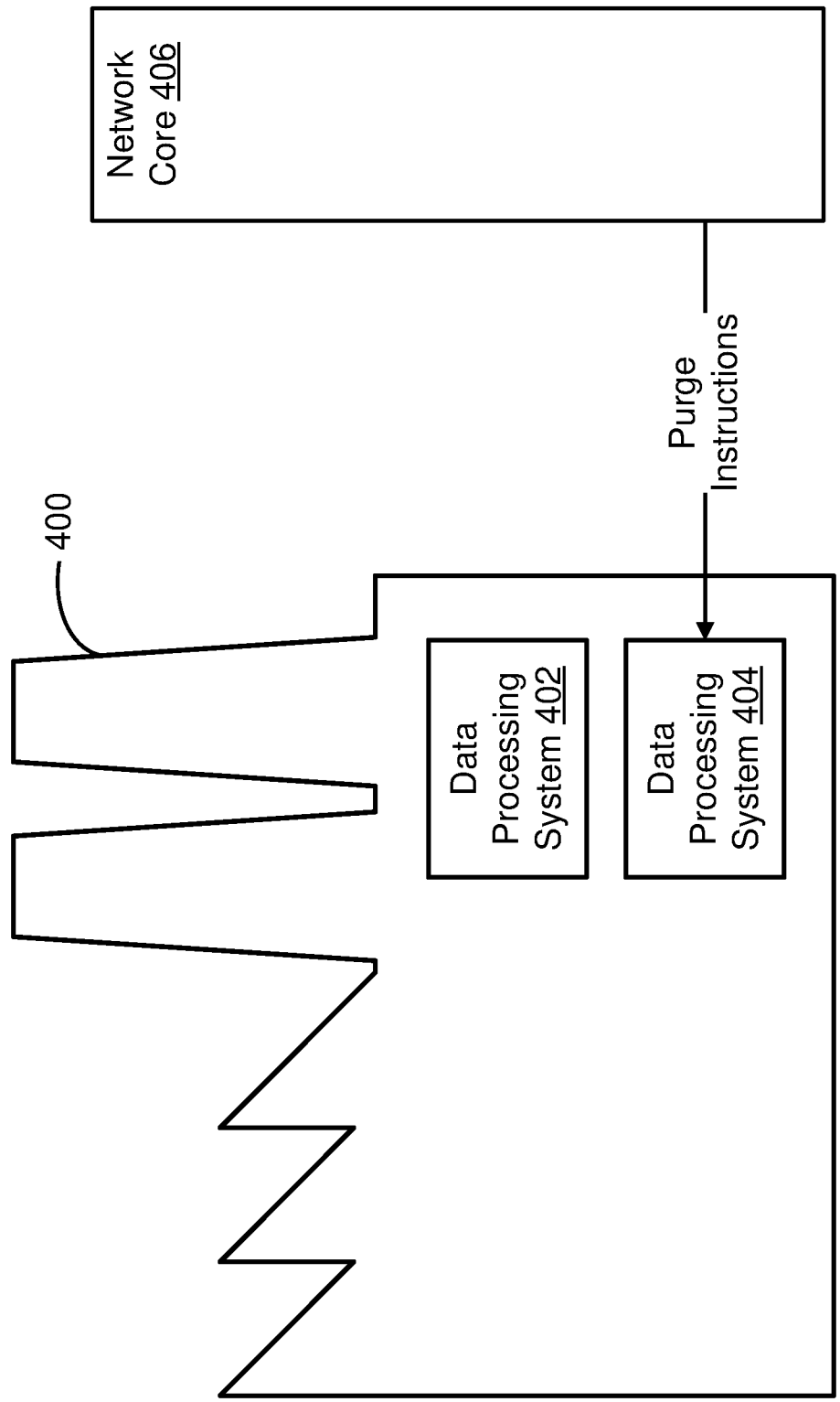

Turning to FIG. 4B, network core 406 may transmit purge instructions to data processing system 404. The purge instructions may include directions to delete the temperature measurement of 42° C. from the activity log hosted by data processing system 404. The purge instructions may also include directions to delete the humidity measurement associated with the anomalous event if network core 406 determines that both data processing system 402 and data processing system 404 should not store any type of data related to the same anomalous event.

The first data point (42° C.) may now only be used to re-authenticate data processing system 402. In the event of a loss of a root of trust between network core 406 and data processing system 402, network core may generate a security questionnaire including security questions related to the first data point. The security questionnaire may be provided to data processing system 402 (not shown) and data processing system 402 may provide a response including answers to the security questionnaire. If the answers in the response match pre-determined acceptable answers identified by network core 406, the root of trust may be re-established between network core 406 and data processing system 402.

Figure 5:
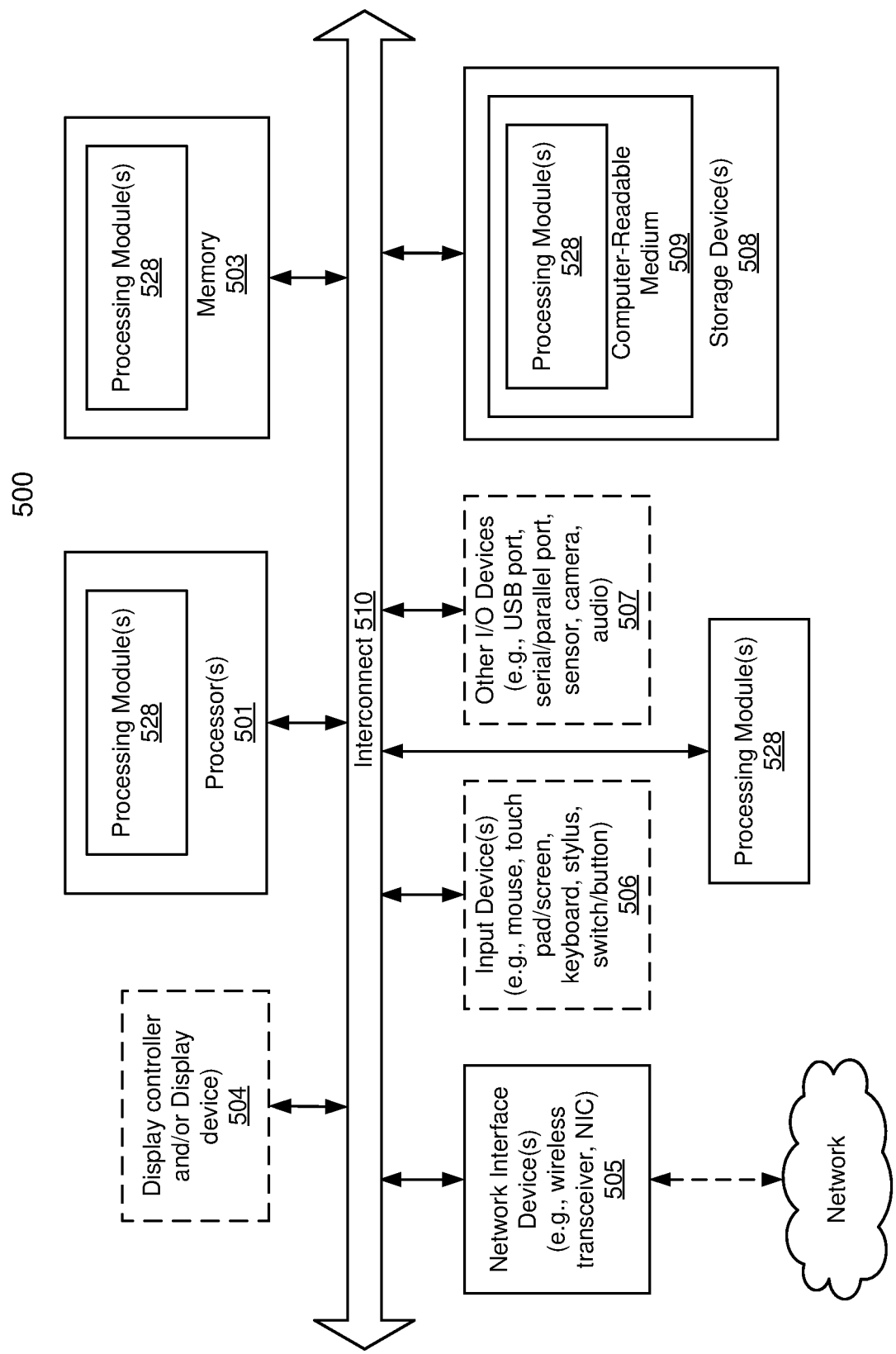
FIG. 5 shows a block diagram illustrating a data processing system in accordance with an embodiment.

Any of the components illustrated in FIGS. 1-4B may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of authenticating data processing systems throughout a distributed environment, the method comprising:
   by a network core of the distributed environment that manages the data processing systems and without human intervention:
      obtaining a first data point from a first data processing system of the data processing systems;
      making a first determination regarding whether the first data point is a low security data point based on a second data point obtained from a second data processing system of the data processing systems;
      in a first instance of the first determination in which the first data point is the low security data point:
         obtaining a rank ordering of the data processing systems based on a degree of security associated with each data processing system of the data processing systems;
         initiating a purging of the first data point from one or more of the data processing systems based on the rank ordering of the data processing systems;
      in a second instance of the first determination in which the first data point is not the low security data point:
         storing the first data point in a first activity log hosted by the network core to obtain an updated first activity log; and
         performing a validation of the first data processing system by providing a security questionnaire to the first data processing system and causing the first data processing system to automatically complete the security questionnaire without human intervention and return the security questionnaire to the network core, the security questionnaire comprising one or more security questions based on the updated first activity log.

2. The method of claim 1, wherein making the first determination comprises:
   making a second determination regarding whether the first data point matches the second data point within a threshold; and
   in a first instance of the second determination in which the first data point matches the second data point within the threshold:
      treating the first data point as the low security data point.

3. The method of claim 1, wherein making the first determination comprises:
   making a second determination regarding whether the first data point is associated with a first event, the first event also being associated with the second data point; and
   in a first instance of the second determination in which the first data point is associated with the first event:
      treating the first data point as the low security data point.

4. The method of claim 1, wherein the degree of security associated with each data processing system of the data processing systems is represented by a security profile, the security profile being based on:
   a global security score associated with a security risk level of a source of each data point provided by the data processing system; and
   a data security score associated with characteristics of each data point provided by the data processing system.

5. The method of claim 4, wherein the degree of security indicated by the security profile increases as a number of data sources associated with the first data processing system increases.

6. The method of claim 4, wherein the degree of security indicated by the security profile increases as a number of events represented by data points provided by the first data processing system increases.

7. The method of claim 1, wherein initiating the purging of the first data point from the one or more of the data processing systems comprises:
   identifying the one or more data processing systems based on the rank ordering of the data processing systems; and
   providing purge instructions to the one or more of the data processing systems, the purge instructions identifying one or more data points to be deleted from the one or more of the data processing systems.

8. The method of claim 7, wherein identifying the one or more of the data processing systems comprises:
   making a third determination regarding whether a rank associated with the first data processing system indicates a lowest degree of security; and
   in a first instance of the third determination in which the rank associated with the first data processing system indicates the lowest degree of security:
      excluding the first data processing system from the one or more of the data processing systems; and
   in a second instance of the third determination in which the rank associated with the first data processing system does not indicate the lowest degree of security:
      including the first data processing system in the one or more of the data processing systems.

9. The method of claim 8, wherein the one or more data points are no longer available for use in validating authenticity of the one or more data processing systems.

10. The method of claim 1, wherein the data processing systems are positioned in a shared environment and data points associated with events occurring in the shared environment are collected by each data processing system of the data processing systems.

11. The method of claim 1, wherein performing the validation of the data processing system comprises:
   identifying an occurrence of an event indicating that the data processing system is to be authenticated;
   obtaining a security questionnaire, based on the occurrence of the event, using the first activity log and a security risk level of the data processing system;
   providing the security questionnaire to the data processing system;
   obtaining a response, the response comprising answers to the security questions in the security questionnaire;
   making a determination regarding whether each answer of the answers matches a pre-determined answer from a set of possible answers; and
   in an instance of the determination in which each answer of the answers matches the pre-determined answer:
      concluding that the data processing system is authentic.

12. The method of claim 1, wherein an entirety of the authenticating of the data processing systems is performed by the network core and the data processing systems without any human intervention.

13. A non-transitory machine-readable medium having instructions stored therein, which when executed by a processor, cause the processor to perform operations for authenticating data processing systems throughout a distributed environment, the operations comprising:
by a network core of the distributed environment that manages the data processing systems and without human intervention:
obtaining a first data point from a first data processing system of the data processing systems;
making a first determination regarding whether the first data point is a low security data point based on a second data point obtained from a second data processing system of the data processing systems;
in a first instance of the first determination in which the first data point is the low security data point:
obtaining a rank ordering of the data processing systems based on a degree of security associated with each data processing system of the data processing systems;
initiating a purging of the first data point from one or more of the data processing systems based on the rank ordering of the data processing systems;
in a second instance of the first determination in which the first data point is not the low security data point:
storing the first data point in a first activity log hosted by the network core to obtain an updated first activity log; and
performing a validation of the first data processing system by providing a security questionnaire to the first data processing system and causing the first data processing system to automatically complete the security questionnaire without human intervention and return the security questionnaire to the network core, the security questionnaire comprising one or more security questions based on the updated first activity log.

14. The non-transitory machine-readable medium of claim 13, wherein making the first determination comprises:
making a second determination regarding whether the first data point matches the second data point within a threshold; and
in a first instance of the second determination in which the first data point matches the second data point within the threshold:
treating the first data point as the low security data point.

15. The non-transitory machine-readable medium of claim 13, wherein making the first determination comprises:
making a second determination regarding whether the first data point is associated with a first event, the first event also being associated with the second data point; and
in a first instance of the second determination in which the first data point is associated with the first event:
treating the first data point as the low security data point.

16. The non-transitory machine-readable medium of claim 13, wherein the degree of security associated with each data processing system of the data processing systems is represented by a security profile, the security profile being based on:
a global security score associated with a security risk level of a source of each data point provided by the data processing system; and
a data security score associated with characteristics of each data point provided by the data processing system.

17. The non-transitory machine-readable medium of claim 16, wherein the degree of security indicated by the security profile increases as a number of data sources associated with the first data processing system increases.

18. A data processing system configured as a network core of a distributed environment that manages data processing systems throughout the distributed environment, comprising:
a processor; and
a memory coupled to the processor to store instructions, which when executed by the processor, cause the processor of the network core to perform operations for authenticating the data processing systems without human intervention, the operations comprising:
obtaining a first data point from a first data processing system of the data processing systems;
making a first determination regarding whether the first data point is a low security data point based on a second data point obtained from a second data processing system of the data processing systems;
in a first instance of the first determination in which the first data point is the low security data point:
obtaining a rank ordering of the data processing systems based on a degree of security associated with each data processing system of the data processing systems;
initiating a purging of the first data point from one or more of the data processing systems based on the rank ordering of the data processing systems;
in a second instance of the first determination in which the first data point is not the low security data point:
storing the first data point in a first activity log hosted by the network core to obtain an updated first activity log; and
performing a validation of the first data processing system by providing a security questionnaire to the first data processing system and causing the first data processing system to automatically complete the security questionnaire without human intervention and return the security questionnaire to the network core, the security questionnaire comprising one or more security questions based on the updated first activity log.

19. The data processing system of claim 18, wherein making the first determination comprises:
making a second determination regarding whether the first data point matches the second data point within a threshold; and
in a first instance of the second determination in which the first data point matches the second data point within the threshold:
treating the first data point as the low security data point.

20. The data processing system of claim 18, wherein making the first determination comprises:
making a second determination regarding whether the first data point is associated with a first event, the first event also being associated with the second data point; and
in a first instance of the second determination in which the first data point is associated with the first event:

treating the first data point as the low security data point.

\* \* \* \* \*